Patented Jan. 10, 1933

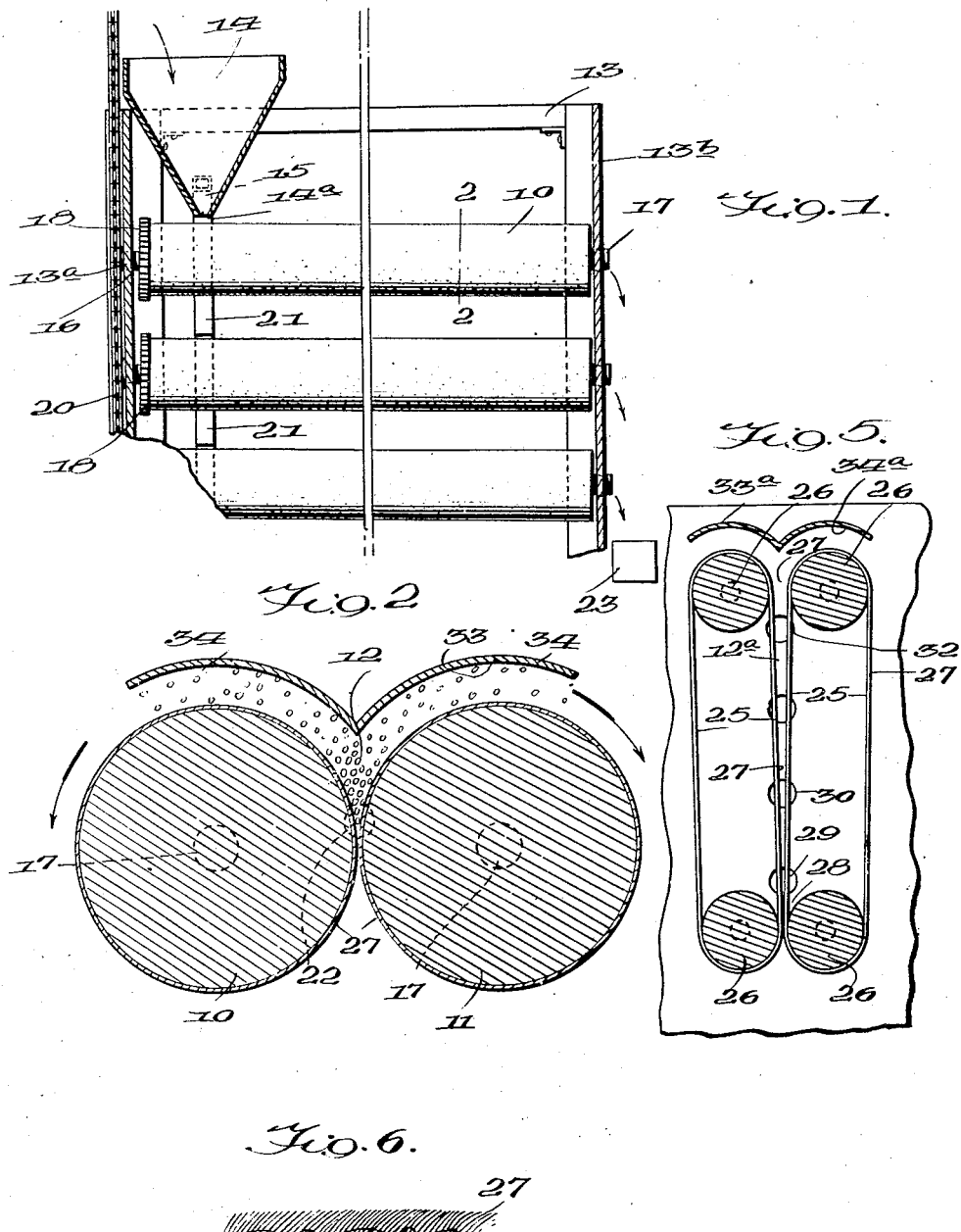

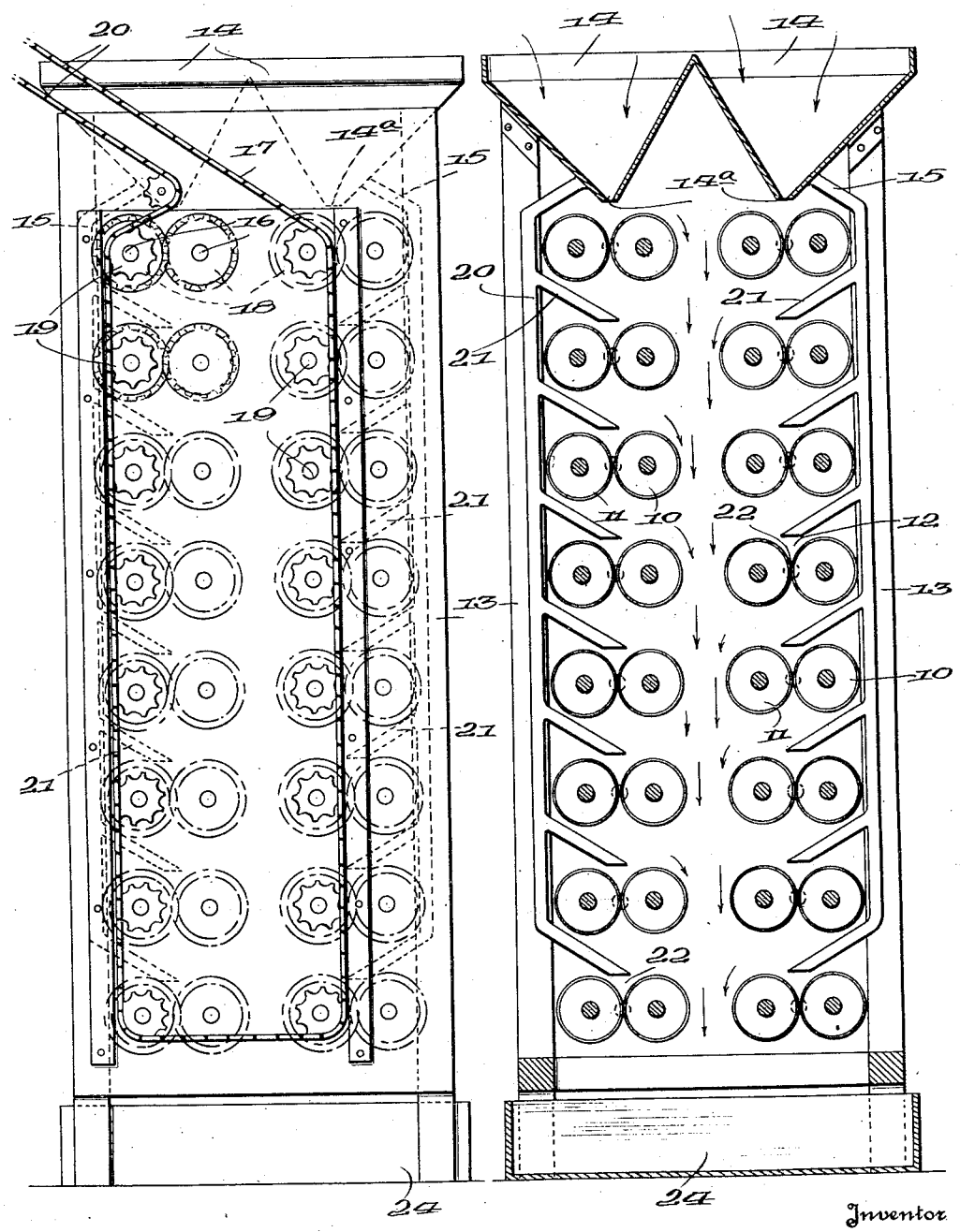

1,894,058

UNITED STATES PATENT OFFICE

WILLIAM A. RICE, OF JERSEYVILLE, ILLINOIS

METHOD AND APPARATUS FOR SEPARATING SEEDS AND THE LIKE

Application filed November 26, 1930. Serial No. 498,494.

The present invention relates to a method and apparatus for separating or eliminating objectionable or desirable seeds of the same kind or seeds of another kind from each other.

While it is known that pairs of outwardly rotating rolls have been used in separating seeds and beans having different surface characteristics, so far as the applicant is aware, no method or machine has been proposed which will successfully or satisfactorily separate dodder seed from clover or alfalfa seeds, due principally to the character of the rolls or their surfaces or the speed of the rolls, or both.

It is the purpose of the present invention to provide a method and machine for separating dodder seeds from clover and alfalfa seeds, particularly, with an accurate separation but which may be used in selection or rejection of certain other seeds and beans. To this end, seeds are fed to the upper end of an inclined trough or runway formed by a pair of upwardly moving downwardly converging surfaces of such a character and moving at such a speed as will cause certain of the seeds, when fed therebetween, to carom upwardly between the surfaces, due to their continuous reversing rotation, and eventually be thrown over or discharged from the runway, while the other seeds, resting upon the bottom of the runway and against said surfaces, are fed to the lower end of the runway to be separately discharged from the machine.

The aforegoing defines the broad principle of the invention and the method employed for separating seeds and beans, but the invention includes the novel method and apparatus hereinafter described and defined in the appended claims. However, it is to be understood that certain modifications and variations may be resorted to in the apparatus and the method herein shown and described without departing from the spirit of this invention; and, while the present disclosure is considered to be advantageous, it is only referred to by way of example.

In order that the invention and manner of the method of separation may be better understood reference may be had to the accompanying drawings, in which—

Figure 1 is a vertical sectional view taken through a separator machine constructed in accordance with the present invention, Figure 2 is a transverse sectional view taken substantially on line 2—2 of Figure 1, Figure 3 is an end view of the machine showing the arrangement of the driving mechanism, Figure 4 is a vertical sectional view taken substantially on line 4—4 of Figure 1, Figure 5 is a transverse sectional view of a modified form of the invention; and Figure 6 is a view of a surface matter for the separating rolls or belts.

In carrying out the invention and with particular reference to Figures 1 to 4 inclusive, a pair of inclined rolls 10 and 11, are employed which are preferably arranged to have their adjacent surfaces contacting and to have their axis arranged in the same horizontal planes so as to provide a trough or runway 12 between their respective upper surfaces. Seed that is to be separated is fed to the elevated end of the trough 12 and, as the rolls are rotated outwardly with respect to the trough, the seed is caused to move downwardly toward the lower end of the rollers, where it may be discharged.

It has been found and is well known that if these rollers 10 and 11 have a knap surface and are rotated at a slow speed (at 30 to 50 R. P. M. as is usual with machines having such knap surfaces) certain seeds will be picked up and carried around on the surface of the rolls while other seeds will remain in the guideway and will not adhere to the surface of the rolls. However, if such knapped surface rolls are rotated at a speed sufficiently high to throw off certain seed, the seed desired to retain will also be thrown off, because the knap has a tendency to entangle about, or adhere to all seed lying in said trough or present to the seeds friction lines of resistance at an angle to the direction of movement of the roller, thereby throwing them off by centrifugal force, and effecting no separation at all.

Applicant has found that, if the surface of the rolls have a velvet-like surface and free of knap, the smooth surfaced seeds will meet with the least possible resistance said latter seeds will remain in the trough or runway, when the rolls are rotated at a higher speed (say, between 150 to 250 R. P. M.) than previously permitted by known methods or devices, but that the rough, split or irregular seeds or other foreign matters carom upwardly and are thrown off from between the rolls. One manner of providing the rolls 10 and 11 with the necessary surface characteristics for accomplishing the above results, is to cover the rolls with a cut-pile fabric 27 (see Figure 6) having the pile inclined or lying backwardly with respect to the direction of rotation of the rollers, thus presenting no longitudinal or diagonal lines of frictional resistance to the smooth seeds, and thereby merely sliding over their surfaces but causing the roughened or irregular surfaced seeds to be buffeted between the moving surfaces of the rolls and carom out of the runway. In practice short pile velvet has been used successfully and, at present, the best and most uniform results are obtained for the separation of dodder, quack grass, foxtail, plantain, sorrell and dock from other more desirable seeds, at approximately two hundred revolutions a minute with the rolls being about 3¼ inches in diameter. However, the rolls may vary in diameter from 2 to 4 inches. Of course it is possible that sufficient speed could be applied to cause even the smooth seeds to be thrown off over the rolls, but the speed can be easily adjusted to suit the results required.

To carry this method forward into an apparatus, a plurality of pairs of rolls 10 and 11 are arranged in superimposed relation in a frame 13 to form vertical rows. There may be as many rows of rolls as desired; however, in the present disclosure the machine is shown as comprising two rows.

The frame 13 may be of any suitable construction or design which will support the rows of rolls 10 and 11, the hoppers 14 and delivering spouts 15. For purposes of illustration the rolls 10 and 11 are shown as being provided with trunnions 16 and 17 at their respective ends which are journalled in bearings at the ends of the frame 13. The trunnions 16 of rolls have fast thereon gear wheels 18, said gears of each pair of rolls 10 and 11 meshing with each other. The trunnions 16 also extend through an end wall 13a of the frame and, at least, one trunnion 16 of each pair of rolls carries a sprocket 19, clearly shown in Figure 2, and over which sprockets a chain 20 passes and driven from a suitable source of power. A hopper 14 is arranged over the uppermost pair of rolls of each row and is provided with a discharge opening 14a positioned to deliver the seed or like material to the upper inclined end of the trough 12 formed by each pair of rolls. Seed is supplied to the lower pair of rolls of each row by a spout 15 extending from the hopper above and having branch spouts 21 extending therefrom to overlie the under inclined end of each pair of rolls, respectively, as clearly shown in Figure 3.

The end wall 13b of the supporting frame is provided with discharge openings 22 one positioned at the end of each trough 12 formed between the adjacent upper surfaces of the rolls, so that the seeds which have been fed down the trough or runway will be discharged therethrough and suitably collected and deposited into a receptacle 23. The seeds that have been thrown off by the rolls 10 and 11 have fallen to the bottom of the machine and collected in a receptacle 24, it being of course understood that the sides of the machine will be closed to prevent the seeds from being scattered.

The invention may be practiced also by the use of mechanism shown in Figure 5 which discloses the separator as having two downwardly converging surfaces which meet or contact at their lower ends spaced at their upper ends approximately ½ inch. This is provided by arranging two endless belts 25 of pile fabric having a reach of the respective belts arranged in opposed relation, but with said faces downwardly converging as before described. Of course, the belts will be trained over inclined rollers or shafts 26. By this form of the invention a much deeper trough or runway 12a is provided for the seeds and permits of a graded separation of seed of varying degrees of surface characteristics. Adjacent the bottom of the trough 12a and at the lower end thereof, is a discharge opening 28 which corresponds to the discharge opening 22, in Figure 2, 3 and 4, and at desired spaced intervals above the opening 28 additional discharge openings 29, 30, 31 and 32 are provided for taking off seeds of varying grades of surface roughness or of kind. Figure 5 is more or less diagrammatic and is only for the purposes of illustration and example and it is, of course, understood that one or all of the rollers 26 may be rotated to cause the surfaces of the belts 25 forming the trough 12a to travel upwardly, in the direction of the arrows.

In the event rolls 10 and 11 are of such large diameter (more than above indicated) that it would be difficult for the seeds to be caromed sufficiently to fall beyond the surface of the rolls, a deflector 33 is provided to overlie the rolls and has curved surfaces (see Fig. 4) which extend from the center of the runway outwardly over and spaced from the surface of the rolls, respectively, so that the seeds that are buffeted upwardly by the outwardly rotation of the rolls 10 and 11 or the belt 25 will carom against the surface 34 of the deflector and the moving surface of either of the rolls 10 and 11 or the belt 25 until they have been thrown from the separator.

By "relatively high speeds", used in the specification, applicant refers to speeds which are in excess of those usually employed in seed separating mills of the adhering or entangling type. By "nap surface" used in the specification, applicant refers to such surfaces to which seeds adhere or in the fibers of which they become entangled or imbedded.

Having thus described the invention, and the manner in which the same is to be performed, what is claimed is:

1. In an apparatus for separating mixed seeds and the like having differing surface characteristics, a pair of rollers having their axes arranged in a plane to provide an inclined trough or runway extending lengthwise of the rolls, means delivering seed at the upper end of said trough, means for rotating said rollers outwardly with respect to said trough, and a pile fabric covering the surface of said rolls and having the pile thereof backwardly inclined substantially circumferentially with respect to the direction of rotation of said rollers relative to said trough.

2. In an apparatus for separating mixed seeds and the like having differing surface characteristics, a pair of rollers having their axes arranged in a plane to provide an inclined trough or runway extending lengthwise of the rolls, means delivering seed at the upper end of said trough, means for rotating said rollers outwardly with respect to said trough, and a pile fabric covering the surface of said rolls and having the pile thereof backwardly inclined substantially, tangentially and circumferentially with respect to the direction of rotation of said rollers.

3. In an apparatus for separating mixed seeds and the like having differing surface characteristics, a pair of rollers having their axes arranged in a plane to provide an inclined trough or runway extending lengthwise of the rolls, means for rotating said rollers outwardly with respect to said trough, and a deflector over said trough and spaced from the surface of said rollers, and having surfaces opposing the surface of the rollers against which said seed may carom in cooperation with the rolls.

4. In an apparatus for separating mixed seed and the like having differing surface characteristics, a pair of endless belts of pile fabric arranged with one reach of each belt in opposed downwardly converging relation to form a substantially deep trough, means over which said belts are trained and mounted to permit said converging surfaces to be moved upwardly, the pile of said belts being backwardly inclined relative to said movement of the belts, means for driving the opposing faces of said belts upwardly, said trough formed by said belts being inclined, means for feeding seed to the upper end of said trough, and take-off means at the lower end of the trough for discharging seed therefrom.

5. In an apparatus of separating mixed seeds which have relatively different surface characteristics, a pair of relatively spaced elements to provide an inclined trough with upwardly extending side walls, one at least being continuous, the bottom of said trough being free of agitation obstructions; means for imparting upward movement to at least one of said walls at a relatively high speed; means on said walls of the trough for selectively caroming certain of said seeds across and upwardly of the trough and for effecting a sliding movement of the other seeds to the lower end of the trough when said upward movement is imparted to said walls, and means for separately collecting the said separated seeds.

6. In an apparatus as set forth in claim 5, being further characterized by the walls of said trough diverging upwardly and means at the lower end of the trough for discharging the seeds retained therein during the seed separation, and a deflector surface arranged over the trough and extending substantially longitudinally thereof in spaced relation of the upper portion of the surfaces of the trough, the portion of said deflector overlying the respective trough surfaces being shaped in substantial conformity with its adjacent trough surface to present an opposing surface to the surface of the trough against which buffeted seeds may carom in cooperation with said movable surfaces.

7. In a device for separating mixed seeds and the like having different surface characteristics, an inclined trough over which seeds pass and comprising two converging walls, the bottom of said trough being free of agitation obstructions, means for moving said surfaces upwardly at a relatively high speed, and the walls of said trough being provided with means having smooth yieldable non-entangling surfaces to which the seed will not adhere whereby certain seed having greater frictional contact with the surfaces at certain speeds of movement of said surfaces are caused to carom between the surfaces and be thrown off from the trough when said surfaces are actuated, while the other seed will remain in the bottom of the trough and be discharged from the lower end thereof.

8. In a device as set forth in claim 7, the converging surfaces forming the inclined trough comprising a pair of endless belts forming a substantially deep trough, means suitably supporting said belts, means for feeding seeds to the upper end of said inclined trough, and a plurality of seed take-offs at the lower end of the trough, said take-offs being positioned respectively at different levels with respect to said trough, whereby seeds of varying surface characteristics may be separated one from the other.

9. A method of separating mixed seeds, each variety of which possesses surface characteristics differing from those of the others, said method including the depositing of mixed seeds within an area defined by upwardly extending surfaces, the character of which being such that the seeds will not adhere thereto and the bottom of said area being devoid of agitation obstructions; and separating certain of the seeds from the mixture by causing them to carom upwardly between said surfaces of said area by moving the latter at a sufficiently high rate of speed while effecting a sliding movement of the other seeds over said surfaces; and separately collecting the separated seeds.

In testimony whereof I have hereunto set my hand.

WILLIAM A. RICE.